United States Patent [19]

Rosenblad

[11] Patent Number: 5,575,889
[45] Date of Patent: Nov. 19, 1996

[54] ROTATING FALLING FILM EVAPORATOR

[76] Inventor: Axel E. Rosenblad, 77 Bayside Dr., Atlantic Highlands, N.J. 07716

[21] Appl. No.: 180,803

[22] Filed: Jan. 10, 1994

Related U.S. Application Data

[63] Continuation of Ser. No. 13,403, Feb. 4, 1993, abandoned.

[51] Int. Cl.⁶ ........................................ B01D 1/22
[52] U.S. Cl. .................. 159/49; 159/13.3; 159/24.1; 159/26.1; 159/27.2; 159/28.6; 159/DIG. 32; 165/115
[58] Field of Search ................. 159/13.3, 24.1, 159/49, 26.1, 28.6, DIG. 32, 28.2, 27.2; 202/236, 238, 197, 235; 203/89, 100, 24, 26, 40; 165/86, 88, 115

[56] References Cited

U.S. PATENT DOCUMENTS

| | | | |
|---|---|---|---|
| 1,501,515 | 7/1924 | Testrup | 159/12 |
| 2,734,023 | 2/1956 | Hickman | 203/10 |
| 2,890,166 | 6/1959 | Heinze | 203/10 |
| 3,136,707 | 6/1964 | Hickman | 159/24.1 |
| 3,152,053 | 10/1964 | Lynam | 159/24.1 |
| 3,175,962 | 3/1965 | Holtslag | 159/24.1 |
| 3,282,797 | 11/1966 | Hammer | 159/24.1 |
| 3,307,614 | 3/1967 | Rosenblad | 159/24.1 |
| 3,788,392 | 1/1974 | Abbott et al. | 165/92 |
| 3,890,205 | 6/1975 | Schnitzer | 159/6.1 |
| 3,997,408 | 12/1976 | Barba et al. | 159/13.2 |
| 4,167,454 | 9/1979 | Feres | 159/6.1 |
| 4,303,468 | 12/1981 | Laguilharre et al. | 159/24 |
| 4,686,003 | 8/1987 | Hockings et al. | 159/DIG. 13 |
| 4,693,304 | 9/1987 | Volland | 159/11.2 |
| 5,139,620 | 8/1992 | Elmore et al. | 159/47.3 |

Primary Examiner—Virginia Manoharan
Attorney, Agent, or Firm—Brooks Haidt Haffner & Delahunty

[57] ABSTRACT

Heating elements having internal spaces for a heating medium such as steam are successively submerged and withdrawn from a bath of liquid to be evaporated. Vapor boiling off the outer surfaces of the heating elements can be returned for use as heating medium. The heating elements can be a bundle of elongated tubes or a plurality of plate-type elements rotatable about a common horizontal axis.

16 Claims, 3 Drawing Sheets

ROTATING FALLING FILM EVAPORATOR

This application is a continuation of application Ser. No. 13,403, filed Feb. 4, 1993 and now abandoned.

BACKGROUND OF THE INVENTION

The invention relates to falling film evaporators in which a liquid to be evaporated or concentrated is distributed on heat exchange surfaces for indirect heat transfer to the liquid from a heating medium such as steam.

DESCRIPTION OF RELATED ART

There are presently available various indirect heat transfer falling film evaporators, in all of which the liquid to be evaporated or concentrated is pumped to the top of a stationary heating surface. The liquid is distributed to the heating surface from above and it falls down the surface as a film. There are essentially two types of heating surface used in falling film evaporators, tubes and plates.

There are basically three kinds of tubular falling film indirect heat transfer evaporators:

1. Vertical tube evaporators in which liquid to be evaporated flows down the inside walls of vertical tubes and the heating medium is outside the tubes. Liquid and boiled off vapors are discharged into a vapor body where they are separated.
2. Vertical tube evaporators in which liquid to be evaporated flows down the outside of vertical tubes and the heating medium is inside the tubes. Liquid and vapor are separated on the heating surface and the vapor is removed from the side of the evaporator.
3. Horizontal tube evaporators in which liquid to be evaporated is distributed to the outer surfaces of horizontal tubes and the heating medium is inside the tubes. The evaporator housing which surrounds the heating surfaces encloses the vapor body. Liquid is removed from the bottom of the housing and boiled off vapors are discharged from the top of the housing.

There are two basic configurations for plate type indirect heat transfer falling film evaporators.

1. Vertical plate evaporators with liquid to be evaporated flows down the outside of plate heat exchange elements and a heating medium is within the plates. A housing encloses the vapor body and liquid and vapor are separated on the heating surface.
2. Gasketed or welded plate heat exchangers wherein alternate channels are used for a heating medium and the falling film of liquid to be evaporated. Liquid is introduced at the top of the heating surface. Concentrated liquor and boiled off vapor are discharged into a vapor body for separation.

The heating medium in these known types of evaporators is most commonly steam, but it can be any condensing vapor or a hot liquid. What these various known configurations of falling film evaporators have in common is that the liquid to be evaporated must be pumped to the top of the heating surface whence it is distributed to the heating surface to fall down the surface as a film.

SUMMARY OF THE INVENTION

The falling film evaporators of the present invention do not require that liquid to be evaporated or condensed be pumped to the top of the heating surface of the evaporator. Instead, the heating surface is rotated about a horizontal axis to submerge successively portions of the heating surface in a pool of liquid which is to be evaporated. By means of this submergence, the surface is coated with a uniform thin film upon emergence from the liquid bath. When the heating surface emerges from the bath the liquid is boiled off by indirect heat exchange with a heating medium that is on the other side of the heating surface; and the vapors are collected above the surface of the pool of liquid for cycling through a mechanical compressor or for passage to a next evaporator effect.

The heating surface can consist of a bundle of parallel horizontal tubes or of a plurality of plate type heat exchange elements extending radially from a horizontal axis of rotation. Heating medium is introduced to the interior of the tubes or plate elements at one end of the bundle tubes or groups of plates and exits at their opposite end. Preferably the axis of rotation of the heat exchange surface elements is above the surface level of the liquid in the pool. The axis of rotation preferably is not concentric with the axis of the evaporator housing.

Baffles can be employed to ensure that there is a graduated increase in solids concentration in the liquid in the axial direction along the length of the pool of liquid being evaporated. The baffles are essentially vertical partitions spaced from each other along the length of the evaporator. This arrangement minimizes losses in heat transfer as the boiling point of the liquid rises because of increased dissolved solids concentration and the viscosity of the liquid increases as the liquid becomes more concentrated as a result of evaporation during its passage through the evaporator.

A mechanical vapor compressor can serve to compress boiled off vapor to be fed to the inside of the heat exchange plates or tubes for use as heating medium. Several evaporators according to the invention can be used together as a multiple effect evaporator. Thermocompression can also be employed in connection with multiple effect evaporators constructed in accordance with the invention for greater efficiency.

Vent gases and condensate exit from the plate heat exchange elements or tubes at the end of the evaporator remote from the entry of the heating medium. The concentrated liquid also leaves the housing of the evaporator at this downstream end.

Vapor boiled off in the evaporator flows freely from all of the heating surface that is not submerged to pass through an entrainment separator before being cycled back as heating medium or being passed on to the next evaporator effect in a multiple effect evaporator.

The bundle of tubes or plurality of plates can be rotated about the axis by means of a motor located outside the housing, or the liquid fed into the evaporator can itself be employed to cause rotation under the effect of gravity.

DETAILED DESCRIPTION OF PREFERRED EMBODIMENTS

Figure 1:
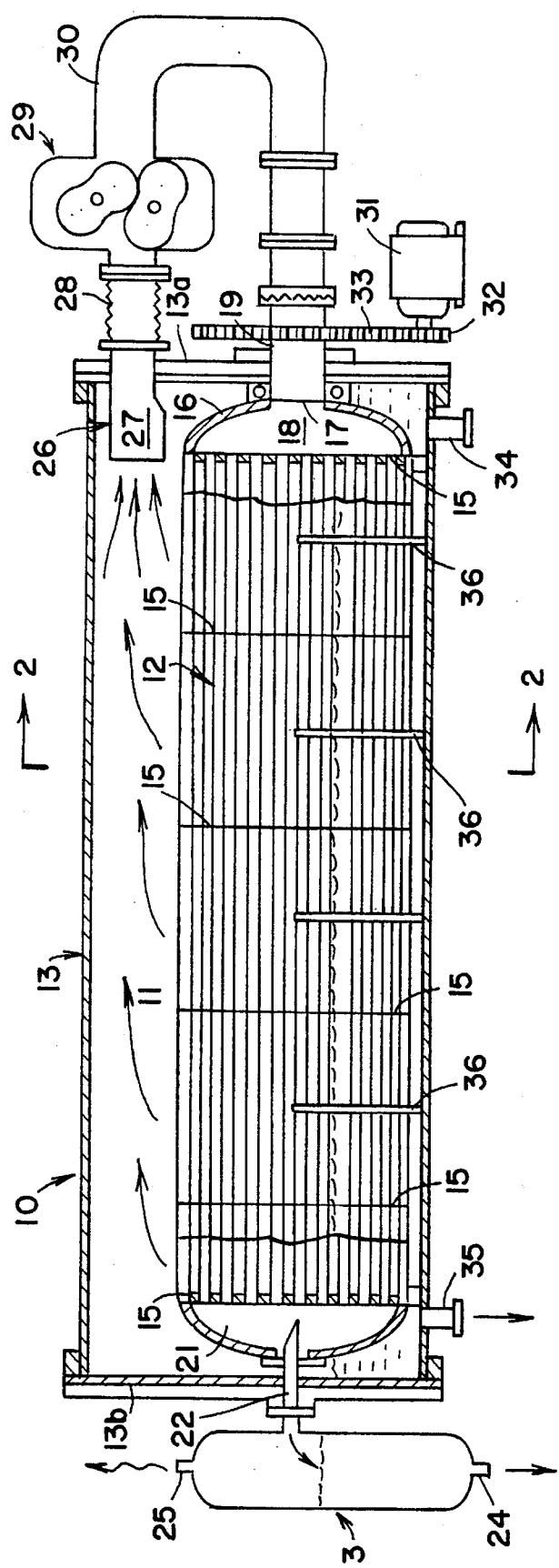
FIG. 1 is a side view, partly in section, of an evaporator in accordance with the invention.
Figure 2:
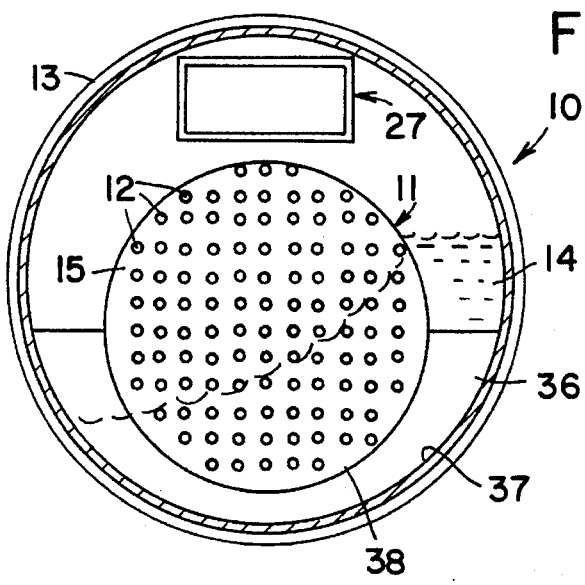
FIG. 2 is a view taken at a right angle to the view of FIG. 1 along the line 2—2, looking in the direction of the arrows, showing the evaporator employed to combine falling film and forced circulation evaporation.

FIGS. 1 and 2 illustrate an embodiment of the evaporator of the invention, generally designated by the reference numeral 10, in which the heat exchange surface consists of a bundle 11 of elongated tubes 12 extending parallel to the axis of a generally cylindrical housing 13 having end walls 13a and 13b. In the drawings, the diameters of the tubes 12 have been shown exaggerated and the number of tubes decreased for the sake of clarity. In practice, a large number of tubes 12, all of a smaller diameter than those shown, would be employed to provide a large aggregate tube surface area for heat exchange between a heating medium within the tubes 12 and a liquid to be evaporated. A body of liquid 14 within the housing 13 is shown in the drawings.

The tubes 12 of the tube bundle 11 are supported at their ends and at spaced locations along their length by tube sheets 15, which are flat discs with a plurality of spaced circular openings through which the tubes 12 extend. The tubes 12 and tube sheets 15 can be formed of steel, such as stainless steel or chromium plated steel, for good heat transfer and resistance to corrosion. The tubes 12 and sheets 15 can be welded together to form the rigid bundle 11 for rotation together around an axis defined by a line passing through the centers of the sheets 15 and parallel to the axis of the housing 13.

A dome-shaped cover 16 with a central circular opening 17 surrounds the ends of the tubes 12 as shown at the right in FIG. 1. A heating medium such as steam is fed to the space 18 within the dome-shaped cover 17 through the conduit 19 which passes through the end wall 13a of the housing. From the space 18 within the cover 16, the heating medium enters the tubes 12 and passes through to the end of the tube bundle 11 shown at the left in FIG. 1.

Another generally dome-shaped cover 20 encloses a space or chamber at the downstream ends of the tubes 12 as shown at the left in FIG. 1. Heating medium such as steam that has been traversed the length of the tubes 12 to the space or chamber defined within the cover 20 exits through a pipe 22 passing through the cover 20 and the housing end wall 13b to be collected in a vessel 23. A plurality of spaced baffles within the cover 20 rotate therewith, lifting condensate up to exit through the pipe 22, which has its end cut off at an angle to collect the condensate. The vessel 23 has an outlet 24 for condensate and an outlet 25 for vent gases.

An outlet 26 for vapor boiled off from the liquid 14 is shown at the right in FIG. 1. The outlet 26 is equipped with an entrainment separator 27, schematically illustrated in FIG. 2, for separating from the boiled-off vapors any liquid entrained thereby. A conduit 28 extends from the outlet 26 to a vapor compressor 29 schematically illustrated in FIG. 1 where the boiled-off vapors are compressed before being cycled via the conduit 30 to the space 18 within the dome-shaped cover 16 to serve as heating medium for the evaporator.

The tube bundle 11, with the associated tube sheets 15 and dome-shaped covers 16 and 20, rotates within the housing 13 about a horizontal axis. FIG. 1 shows a motor 31 for driving a gear 32 that in turn drives a gear 33 secured to the vapor entry conduit 19 for rotating the tube bundle 11. Of course, the gear drive arrangement shown is merely illustrative and some other arrangement such as a belt drive could be employed for rotating the tube bundle 11 and its associated elements.

An inlet 34 for feeding liquid 14 to be evaporated into the evaporator 10 is shown at the lower right in FIG. 1, and an outlet 35 for concentrated liquid that has passed along the length of the evaporator is shown at the lower left in FIG. 1.

Feed liquid to be evaporated enters the housing 13 through the inlet 34. The dome-shaped cover 16 prevents the liquid from passing into the interior spaces within the tubes 12, and the liquid 14 forms a pool or bath surrounding the lower portion of the tube bundle 11. In the illustration of FIG. 1 the liquid 14 is shown as passing from right to left through the evaporator housing 13 to exit as concentrated product via the outlet 35.

In the zone within the evaporator housing 13 to the left of the dome-shaped cover 16, the liquid 14 contacts those tubes 12 of the tube bundle 11 which are passing through the lower arc of their circular rotation about the central axis of the bundle 11. As the tube bundle 11 rotates, the outer surfaces of the tubes 12 emerging from the liquid 14 carry a film of liquid. The liquid film is evaporated by indirect heat transfer from the heating medium within the tubes 12 and vapors generated by the evaporation of the liquid film passes in the direction shown by the arrows in FIG. 1 to the entrainment separator 27 and the boiled-off vapor outlet 26.

Upright baffles 36, extending between the outer cylindrical wall of the housing 13 and the cylindrical zone defined by the tube bundle 11 insure that the liquid flows essentially in one direction, from right to left in the embodiment illustrated in FIG. 1. The baffles 36 are spaced from each other along the length of the tube bundle 11, and spaced away from tube sheets 15 which provide support along the length of the tubes 12. The presence of the baffles 36 divides the pool of liquid 14 into successive zones of increasing concentration from right to left. As the liquid has been exposed to heat transfer from the heating medium within the tubes 12 during its passage from the inlet 34 to the outlet 35, evaporation will have boiled off more and more of the liquid, increasing the concentration of solids in the liquid and the viscosity of the liquid. The maintenance of a graduated increase in concentration will minimize the losses in heat transfer caused by elevation of the liquid's boiling point as solids concentration increases.

The shape of the baffles 36 can be seen in FIG. 2. Each baffle 36 has an outer arcuate edge 37 corresponding to the inner arcuate surface of the wall of the housing 13. This edge 37 is secured to the housing, for example, by welding.

An inner arcuate edge portion 38 of each baffle 36 is closely adjacent to an imaginary cylindrical surface defined by the periphery of the tube bundle 11, i.e. by the outer circular edges of the tube sheets 15. The tube bundle 11 is spaced away from the inner baffle edge portions 38 by a distance sufficient to permit free rotation of the tube bundle 11.

The evaporator according to the invention can preferably have the axis of rotation of the heating surface located below the longitudinal axis of the housing 13 as shown in FIG. 1, allowing a large open zone for boiled-off vapor to be collected so that vapor can move freely to the entrainment separator 27 and outlet conduit 28. As also shown in FIG. 1, the axis of rotation of the heating surface is preferably above the surface of the liquid 14 in the housing 13 for effective falling film evaporation.

However, the evaporator according to the invention can also employ forced circulation by controlling the liquid level. The heat exchange surface can, if desired, be entirely immersed in the liquid 14, or a greater portion of the surface than that illustrated in FIG. 1 may be submerged, while still allowing some of the surface to emerge from below the liquid surface during rotation.

The cross-sectional view of FIG. 2 illustrates the surface level of the liquid 14 within the evaporator housing 13 as the tube bundle 11 rotates counter-clockwise to provide for forced circulation as well as falling film evaporation. Such forced circulation is controlled by maintaining the liquid levels throughout the evaporator higher than the liquid levels maintained for falling film evaporation alone. At the left, the liquid surface is shown to be pulled down by the rotating tube bundle 11 and at the right, the liquid surface is pushed up by the rotating motion. It will be seen that liquid 14 is in contact with the outer surfaces of tubes 12 submerged below the liquid surface within the tube bundle 11, and that above the liquid surface, liquid carried as a film by the surfaces of tubes 12 can boil off as vapor in free communication with the entrainment separator 27 through which vapor exits via the outlet 26.

It will be understood that rotary bearings and seals are to be provided between rotating elements and fixed elements. The structure and function of such bearings and seals is well known. Rotary seals to prevent leakage are required in the embodiment shown in FIG. 1, at both ends of the heating medium entry conduit 19 and at the junction between the outlet pipe 22 and the dome-shaped cover 20.

Figure 3:
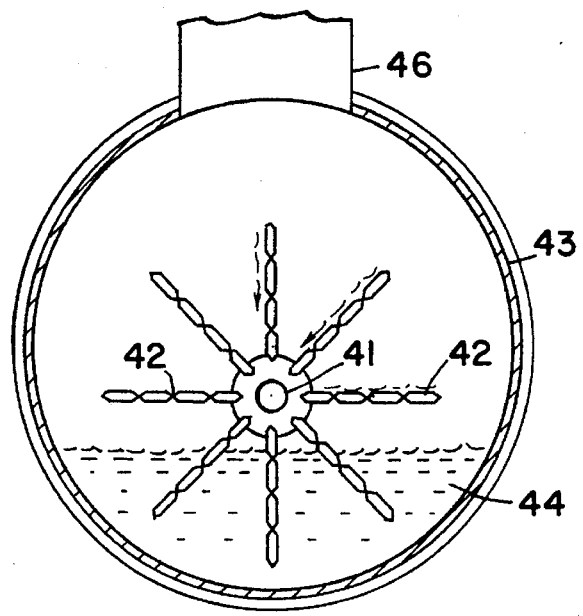
FIG. 3 is a sectional view taken in the direction of the axis of the evaporator, and showing a radially arranged group of plate heat exchange elements.
Figure 5:
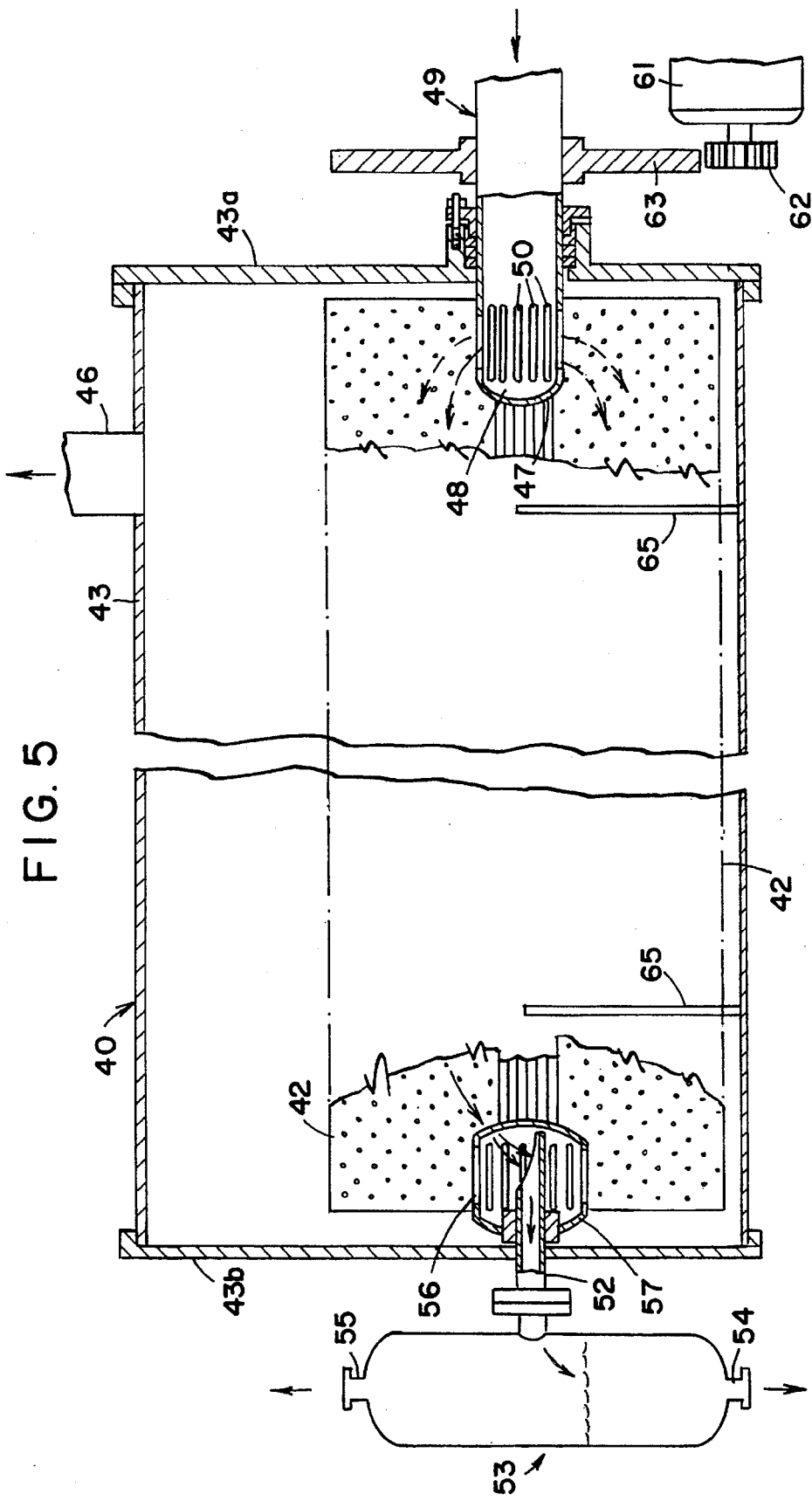
FIG. 5 is a side view of an evaporator according to the invention, partly in section and with a portion broken away, illustrating the path of heating medium through plate elements.

The embodiment of the evaporator of the invention shown in FIGS. 3 and 5 differs from that of FIGS. 1 and 2 in that plate-type heat exchange elements extending radially from a horizontal axis of rotation are employed instead of the horizontal tube bundle of FIGS. 1 and 2. Dimpled plate heat exchanger elements and a method for the manufacture of such plate-type elements are disclosed in U.S. Pat. No. 3,515,239 granted May 19, 1970, the disclosure of which is herein expressly incorporated by reference.

The evaporator 40 of FIG. 5 has a generally cylindrical housing 43 with end walls 43a and 43b. The housing 43 has an outlet 46 for vapor boiled off by evaporation. The evaporator 40 has an inlet for liquid to be evaporated and an outlet for product liquid (not shown in FIG. 5) like the inlet 34 and outlet 35 illustrated in FIG. 1, and an entrainment separator (not shown) like the separator 27 of FIGS. 1 and 2 can be provided for vapors passing to the vapor outlet 46.

Heating medium, such as steam, enters the housing 43 through a conduit 49 shown passing through the end wall 43a of the housing 40. The motor 61 and gears 62 and 63 for rotating the heating surface of the evaporator 40 correspond to the motor 31 and gears 32 and 33 of the embodiment of FIG. 1. At the downstream or left hand end of the evaporator 40 there is a vessel 53 like the receptacle 23 of FIG. 1 with outlets 54 and 55 for condensate liquid and vent gas respectively.

A plurality (eight shown in FIG. 3) of flat plate-type heat exchange elements 42 through which heating medium is passed extend radially outward from a central horizontal axis of rotation. Each plate-type element comprises a pair of spaced, rectangular plates joined together around their peripheries, as for example, by welding.

As the plate-type heating elements 42 rotate about the axis 41, the elements 42 pass through a pool of liquid 44 as shown in FIG. 3. Upon emerging from the liquid 44, the outer surfaces of the elements 42 carry a thin film of liquid which is evaporated by heat transfer from the heating medium within the elements 42, and boiled-off vapors exit from the housing 43 by way of the outlet 46.

FIG. 5 illustrates how heating medium enters the space enclosed within the plate-type elements 42 via the conduit 49 and exits to the vessel 53 shown at the left in the drawing. As shown in FIG. 5 the inner end of the heating medium entry conduit 49 is closed by a wall 47, so that the conduit 49 and wall 47 define a chamber 48 which communicates with the interior spaces of the several plate-type elements through a plurality of radially spaced longitudinally extending slot-like openings 50. At the inner corners of the plate-type elements 42, the pair of plates constituting each element are not joined, leaving an opening for the entry into the interior of each element 42 for the entry of heating medium through a slot-like opening 50 facing the opening between the pairs of plates of the element 42. Heating medium flows into the interior spaces of the elements 42 from the chamber 48 through the openings 50 as shown by the arrows.

At the downstream end of the evaporator 40, heating medium exits through the outlet pipe 52 to the vessel 53. For this purpose, the inner corner portions of the plates forming the elements 42 at the downstream end, as at the upstream end, are not joined together, providing a slot-like opening 56 at what can be considered a cut-away corner of each element 42. Heating medium passes through the openings to a generally annular chamber 57 which rotates along with the plate-type elements 42 about the horizontal axis. Heating medium leaves the chamber 57 via the open inner end 58 of the outlet pipe 52. The flow of heating medium at the downstream end of the evaporator 40 is shown by arrows.

In the embodiment of FIG. 5, a plurality of upright baffles 65, like the baffles 35 of the embodiment of FIG. 1 are provided at longitudinally spaced locations within the housing 43 to insure that liquid 44 being evaporated flows essentially in one longitudinal direction (from right to left in the drawing).

Conventional rotary bearings and seals are provided between rotating elements and fixed elements at both end walls 43a and 43b, where the rotating vapor entry conduit 49 enters and where the rotating outlet pipe 52 exits the housing 43, and at the outer end of the outlet pipe 52 where it is connected to the vessel 53.

The indirect falling film evaporators of the tubular embodiment of FIG. 1 and of the plate-type embodiment of FIGS. 3 and 5 both operate in essentially the same way by rotating heating elements to successively submerge the heating elements in liquid to be evaporated and withdraw the heating elements from the liquid for evaporation of liquid on outer surfaces of the elements. The evaporator 40 of FIGS. 3 and 5, like the evaporator 10, can be provided with a vapor compressor for compressing boiled-off vapor to be returned as heating medium to the evaporator.

Figure 4:
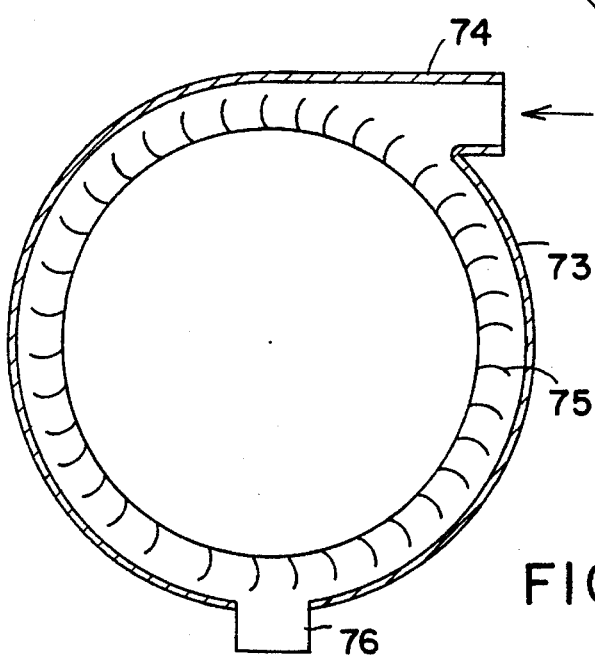
FIG. 4 is an axial view in section of an evaporator according to the invention and illustrating a way in which feed liquid can be used to rotate the heat exchange surface.

An alternative means for rotating the evaporator heating surface is shown in FIG. 4, wherein the weight of the liquid fed into the evaporator housing 73 through an inlet 74 causes the surface to rotate. The liquid entering through the inlet 74 is caught by curved blades 75 extending generally radially from the circumference of the rotatable heating surface assemblage, for example, from the circumference of an element like the dome-like cover 16 of the evaporator of FIG. 1. The blades 75 work like the buckets or boxes of a paddle wheel to rotate the heating surface counter-clockwise, spilling out the liquid at the bottom of their travel as shown at 76. As yet another alternative, a turbine driven by the feed liquid could be used to drive the rotating heat exchange surface.

Various modifications, adaptations and applications of the evaporator of the invention will suggest themselves to those having skill in the art, and such variations are considered to be within the spirit and scope of the invention.

What is claimed is:

1. An indirect heat exchange falling film evaporator comprising: a fixed evaporator housing for containing a pool of liquid to be evaporated and an enclosed space above the pool of liquid for vapor boiled off from the liquid by evaporation; an inlet for feeding liquid to be evaporated into the housing and an outlet from the housing for liquid concentrated by evaporation; an outlet from the housing for discharging from said enclosed space above the pool of liquid vapor boiled off from the liquid by evaporation; a plurality of heating elements within the housing mounted for rotation about a common horizontal axis, each of said heating elements having an outer surface for contact with liquid in the pool of liquid to be evaporated within the housing and having an internal passage for heating medium and an element inlet and an element outlet for the heating medium, said element heating medium inlets opening on to a chamber defined within a wall for preventing liquid to be evaporated from entering the internal passages and said element heating medium outlets opening on to another chamber; and means for rotating the heating elements and chambers together with respect to the housing to successively submerge the heating elements in the liquid and withdraw the heating elements from the liquid on the outer surfaces of the elements so that liquid is carried from the pool on the outer surfaces of the elements and falls down said outer surfaces of the elements as a film under the influence of gravity.

2. The evaporator of claim 1 wherein the heating elements comprise a plurality of horizontal tubes mounted for rotation as a group around the common horizontal axis.

3. The evaporator of claim 1 wherein the heating elements comprise a plurality of plate-type elements extending radially from the common horizontal axis of rotation.

4. The evaporator of claim 1 wherein there are spaced baffles within the housing for insuring flow of liquid in one longitudinal direction.

5. The evaporator of claim 1 and including means for mechanically compressing vapor discharged from the housing and for using the compressed vapor as heating medium.

6. The evaporator of claim 1 and including an entrainment separator associated with the outlet for discharging vapor.

7. The-evaporator of claim 1 wherein the means for rotating the heating elements includes a motor outside the housing.

8. The evaporator of claim 1 wherein the means for rotating the heating elements includes gravity driven means for employing the weight of liquid fed into the housing to cause rotation of the heating elements.

9. The evaporator of claim 1 and including means for varying the rate of rotation of the heating elements.

10. The apparatus of claim 1 wherein the heating medium is steam and including means for introducing steam into inlets of the heating elements.

11. The evaporator of claim 1 and including a vessel outside the housing for separating liquid condensate from vent gases.

12. A method for evaporating liquid by indirect heat exchange falling film evaporation comprising; providing, in a lower portion of a fixed evaporator housing, a pool of liquid to be evaporated: introducing heating medium into a chamber within the housing and passing said heating medium from said chamber within the housing through interior spaces within a plurality of heating elements mounted for rotation about a common horizontal axis in said housing while preventing liquid to be evaporated from entering said interior space; rotating the heating elements and the chamber together with respect to said housing about the common axis of rotation to successively submerge the heating elements in the pool of liquid and to withdraw the heating elements from the liquid so that outer surfaces of the heating elements carry liquid from the pool to fall down said outer surfaces as a film under the influence of gravity, collecting vapor generated by evaporation in an upper portion of said housing and discharging collected vapor from said housing, wherein the heating elements comprise a plurality of horizontal tubes.

13. A method for evaporating liquid by indirect heat exchange falling film evaporation comprising; providing, in a lower portion of a fixed evaporator housing, a pool of liquid to be evaporated; introducing heating medium into a chamber within the housing and passing said heating medium from said chamber within the housing through interior spaces within a plurality of heating elements mounted for rotation about a common horizontal axis in said housing while preventing liquid to be evaporated from entering said interior spaces; rotating the heating elements and the chamber together with respect to said housing about the common axis of rotation to successively submerge the heating elements in the pool of liquid and to withdraw the heating elements from the liquid so that outer surfaces of the heating elements carry liquid from the pool to fall down said outer surfaces as a film under the influence of gravity, collecting vapor generated by evaporation in an upper portion of said housing and discharging collected vapor from said housing, wherein the heating elements comprise a plurality of plate-type elements extending radially from the common horizontal axis of rotation, each plate-type element comprising a pair of spaced, rectangular plates joined together around their peripheries.

14. The method of claim 12 or 13 and including causing liquid in the pool to increase in solids concentration in one longitudinal direction by placing longitudinally spaced baffles in the pool.

15. The method of claim 12 or 13 wherein the heating medium is steam.

16. A method for evaporating liquid by indirect heat exchange falling film evaporation comprising: providing, in a lower portion of a fixed evaporator housing, a pool of liquid to be evaporated; introducing heating medium into a chamber within the housing and passing said heating medium from said chamber within the housing through interior spaces within a plurality of heating elements mounted for rotation about a common horizontal axis in said housing while preventing liquid to be evaporated from entering said interior spaces; rotating the heating elements and the chamber together with respect to said housing about the common axis of rotation to successively submerge the heating elements in the pool of liquid and to withdraw the heating elements from the liquid so that outer surfaces of the heating elements carry liquid from the pool to fall down said outer surfaces as a film under the influence of gravity, collecting vapor generated by evaporation in an upper portion of said housing and discharging collected vapor from said housing and including causing liquid in the pool to increase in solids concentration in one longitudinal direction by placing longitudinally spaced baffles in the pool.

\* \* \* \* \*

UNITED STATES PATENT AND TRADEMARK OFFICE
CERTIFICATE OF CORRECTION

PATENT NO. : 5,575,889
DATED : November 19, 1996
INVENTOR(S) : Axel E. Rosenblad It is certified that error appears in the above-indentified patent and that said Letters Patent is hereby corrected as shown below:

Column 8, line 7, change "space" to --spaces--;

Signed and Sealed this

Twenty-eighth Day of January, 1997

Attest:

BRUCE LEHMAN

Attesting Officer    Commissioner of Patents and Trademarks